United States Patent [19]

Lehmkuhl

[11] Patent Number: 4,752,166
[45] Date of Patent: Jun. 21, 1988

[54] PROBING DEVICE
[75] Inventor: Robert A. Lehmkuhl, Madison, N.J.
[73] Assignee: Manuflex Corp., Cincinnati, Ohio
[21] Appl. No.: 1,801
[22] Filed: Jan. 2, 1987
[51] Int. Cl.⁴ ............................................. B23C 1/06
[52] U.S. Cl. ..................................... 409/127; 33/504; 33/558; 33/561; 409/218
[58] Field of Search .................................. 33/503–505, 33/556, 558, 559, 561, 572; 409/127, 218

[56] References Cited

U.S. PATENT DOCUMENTS

| | | | |
|---|---|---|---|
| 4,118,871 | 10/1978 | Kirkham | 33/505 |
| 4,425,061 | 1/1984 | Kindl et al. | 409/218 |
| 4,447,958 | 5/1984 | Tanaka | 33/561 |
| 4,510,693 | 4/1985 | Cusack | 33/561 |
| 4,516,327 | 5/1985 | Kanda et al. | 33/559 |
| 4,523,382 | 6/1985 | Werner et al. | 33/561 |
| 4,530,159 | 7/1985 | Ernst | 33/559 |
| 4,530,160 | 7/1985 | Feichtinger | 33/559 |
| 4,535,543 | 8/1985 | Linder | 33/559 |
| 4,562,646 | 1/1986 | Dall'Aglio | 33/559 |
| 4,612,709 | 9/1986 | Baisch et al. | 33/556 |

*Primary Examiner*—J. Patrick McQuade
*Attorney, Agent, or Firm*—Edward J. Utz

[57] ABSTRACT

A probe having a stylus spindle mounted in a machine tool for locating an object in relation to the stylus measurable along two axis perpendicular to the centerline of the stylus or in the plus and minus direction parallel to the center line of the stylus. The probe provides a discreet signal on contact or a signal level proportional to deflection of the stylus through interfacing with the machine computer numerical control by a machine mounted transducer unit.

18 Claims, 11 Drawing Sheets

PROBING DEVICE

My invention comprises a probing system consisting of a variety of spindle mounted probing devices arranged to work in connection wit a machine mounted transducer unit.

The principle object of my invention is to provide a spindle mounted probe oapable of locating the work surface in relation to the position of the spindle along the center line of the spindle.

Another object of my invention is to locate the work surface in relation to the spindle feed axis home or zero position in a plane perpendicular to the center line of the spindle.

Another object of my invention is to define the contour of the work surface by moving the workpiece or spindle in a plane perpendicular to the spindle centerline.

Another object of my invention is to inspect the contour of a workpiece in relation to the center of the spindle by moving the workpiece or spindle with the same part shape program used to generate the workpiece.

Another object of my invention is to determine the location of the work surface in relation to the spindle feed axis zero position in a plane perpendicular to the center line of the spindle in both the plus and minus direction.

Another object of my invention is to provide a probing system capable of controlling the machine axis traverse rate system in order to decelerate from a rapid traverse rate to an absolute position.

Another object of my invention is to provide a probing system capable of sending a trigger signal to a position detection circuit the instant the probe contacts the work surface.

Another object of my invention is to have the spindle mounted probing devices work in conjunction with a machine mounted linear variable displacement transducer unit.

Another object of my invention is to provide a spindle mounted probe device operable in a single angular position and multiple angular positions.

Another object of my invention is to provide a mechanical probe stylus mounting device that has uniform triggering travels regardless of stylus deflection direction.

Another object of my invention is to provide a machine mounted linear variable displacement transducer unit capable of working in conjunction with spindle mounted probing devices.

Another object of my invention is to have the probe stylus constantly parallel to the spindle center and thus to avoid any negative affect on probing accuracy due to stylus length.

Another object of my invention is to provide a spindle mounted probe system capable of defining the contour of a work surface in a plane parallel to the spindle center line.

Another object of my invention is to provide a spindle mounted probing system capable of defining the contour of a work surface in a plane perpendicular to the spindle center line.

Another object of my invention is to provide a probing device having antifriction internal operating mechanisms preloaded for zero looseness.

In present probing systems the output of the stylus deflection device is a discreet trigger signal. The amount of stylus pretravel deflection is directionally sensitive due to the lobing effect of a three point support.

The present probing systems require a dedicated machine mounted inductive receiver, receiving signals from a complex switching arrangement internal to the probe head, or a more complicated probing head having not only a complex switching arrangement, but also other devices using centrifical switches and/or infra-red signals or the like to indicate to a machine mounted receiver that the stylus mechanism has been triggered.

The present probing systems are not capable of sending signals proportional to stylus deflection or controlling the rate of axis deceleration to discreet null position for triggering the machine axis location.

To overcome these and other disadvantages I have provided a probing system arranged to work in conjunction with a common machine mounted transducer unit.

I provide probing devices consisting of a main support body retained in the taper of the machine spindle. The stylus is retained in a spring loaded operating head supported by an anti-friction slide arrangement mounted to the main support body.

If the probe is to be used only for locating surface perpendicular to the spindle centerline, then the stylus deflection is limited to motion parallel to the spindle centerline.

If the probe is to be used only for locating surface parallel to the centerline of the spindle then the stylus deflection is limited to motion perpendicular to the spindle centerline.

If the probe is to be used for locating surface perpendicular and parallel to the spindle line or angular surface, then the spring load operating head is mounted to permit stylus deflection from any angle.

In all cases the stylus is spring biased to a neutral position. This neutral position establishes the null signal of linear variable displacement transducer described below.

All of the probing devices operate the machine mounted transducer unit with a non-rotating torque arm mounted on anti-friction bearings. The torque arm mounting can be arranged for the probing cycle to be done with either a single angular position for spindle orientation or multiple angular positions for spindle orientation.

The support body of the probing device is fitted with a center shaft with external ground splines configured to mate with a sliding bushing incorporating ball bearings in linear tracks that are fitted to provide a preload fit between the sliding bushing and spline shaft.

In a probing device arranged for stylus deflection parallel to the probe centerline the torque arm bore is tightly fitted and pinned to the ball spline bushing. The stylus mounting head is connected to the torque arm, this assembly is retained to the support body by a center shaft and spring preloaded axially against a positive stop.

The torque arm is fitted with an operation plunger that operates against a spring loaded piston in the transducer unit housing. The piston is fitted with a probe present limit switch and is connected to a yoke which operates the slider of a linear variable displacement transducer mounted to the transducer unit housing.

During a probing cycle the spindle is advanced toward the workpiece until the stylus contacts the work surface. Continued spindle advancement will cause the stylus, mounting head and ball spline bushing mounted torque arm to be displaced in relation to the support body. This displacement will cause the torque arm plunger to displace the spring loaded piston and the yoke connected to the piston and electronic transducer slider to move in relation to the transducer body.

The transducer slide displacement will cause a signal to be sent to the machine Computer Numerical Control the instant the probe contacts the work surface. The step function signal produced is used to trigger the probe compatible logic in the CNC and the sequence requires an axis reversal motion at a lower feed rate to read the probe system output and position location.

Alternately if the probe sequence uses the proportional signal, then the displacement of the transducer slider will signal the feed rate control circuit of the CNC to gradually reduce the feed rate to zero to a programmed position of the transducer in a distance necessary for normal deceleration. At the programmed position a trigger signal will be sent to the position detector logic in the CNC, thus establishing work surface location.

Another method of using the proportional signal is to have the displacement of the transducer slider signal the feed rate control circuit of the CNC to reduce the feed rate to "0" in a distance necessary for normal deceleration. The CNC will then subtract the amount of transducer slider displacement from the machine axis position to determine the exact point the stylus contacted the work surface.

The controlled deceleration permitting zero feed rate produces an accurate work surface locating sequence.

When surface flatness is to be defined the spindle is advanced toward the workpiece until the stylus contacts the work surface. The spindle is then positioned in relation to the work surface an amount that allows the stylus to be axially displaced a fixed amount from the stylus neutral position. The workpiece is then moved in relation to the spindle in a plane perpendicular to the spindle center line. Any surface deviation from a true flat plane will cause the stylus to move axially causing the transducer slider to be displaced from the previously defined fixed location from the neutral position. The axial movement caused by surface deviation will be read by the CNC from the electronic variable displacement transducer.

If the work surface is contoured and the contour was generated by a three axis machine, then the surface can be inspected in a similar manner. The work surface is defined by using a part program to control the motion of the three axis and reading the deviation by the amount of transducer displacement. Another method would be to move the workpiece in a plane perpendicular to the spindle center line with the spindle fully retracted. At given coordinates of workpiece location the spindle is advanced until the stylus contacts the work surface. The spindle is then retracted a programmed amount sufficient for the stylus to clear the surface and the workpiece is moved to a different coordinate.

Using the method where the deviations are continuously read by the CNC from the transducer output produces a more complete and accurate work surface definition.

In a probing device arranged for stylus deflection perpendicular to the spindle centerline the torque arm body is tightly fitted and pinned to the ball spline bushing. The stylus mounting head assembly is secured to the end of the spline shaft and consists of a stylus head located and supported between two parallel surfaces perpendicular to the spindle center line by means of precision preload antifriction ball bearings. The ball bearings are retained in a spacer ring and since they contact flat surfaces they permit the stylus head to move freely parallel to the mounting surfaces. The stylus head engages an orientation device designed to allow the above motion but prevents the head from rotating thus preventing any deviation in reading errors as the stylus contacts the work surface. The stylus head has a precision 90° tapered hole located in the surface opposite the stylus.

A precision ball operates in the tapered hole. A center shaft also has a precision 90° tapered hole on one end that also operates on the same ball. The center shaft is supported by a ball bushing. The opposite end of the center shaft operates against a bar fastened to the torque arm body. The torque arm, bar, and center shaft are spring loaded so the tapered hole on the center shaft operating against the ball opposite the tapered hole in the stylus head will cause the stylus head to seek neutral position along a place perpendicular to the stylus center line.

Any deflection of the stylus in this plane will move the stylus head on its antifriction ball mounting causing the ball operating between the tapered holes in the stylus head and the tapered holes in the center shaft to roll along the side of the tapered holes of both members. The resultant side force on the center shaft is supported by the ball bushing, therefore, all movements necessary to translate the side force against the stylus to an axial force parallel to the stylus is completely friction free. The resultant axial force will cause the center shaft, bar, and torque arm to move axially along this ball spline shaft and the stylus will remain parallel to the neutral position when deflected along a plane perpendicular to the probe center line.

Another configuration of the probing device is constructed similar to the above, which permits the stylus to move axially in relation to the support body carrying the stylus head. This axial motion is also spring loaded and will cause the stylus to seek a neutral position in three directions. The stylus mounting head is supported in a steep tapered hole when it is in its axially neutral position. The taper is steep enough to give rigid support with no side play, but is self releasing along its center line.

By using a configuration for contacting either the upper or lower portion of the work surface perpendicular to the stylus center line is established. When this type of probe is used the initial insertion of the probe into the spindle wall causes the transducer slider to be displaced by a fixed amount, the CNC will establish the null position at this point. Any deviation from null will trigger the position detection logic in the CNC - thereby locating the work surface in whatever direction the stylus is moving.

In the drawings, the same reference numerals are used throughout the several views and refer to the same parts, and the sectional views are taken looking in the direction of the arrows at the ends of the section lines.

Referring now to the drawings, I show:

OPERATION

Figure 1:
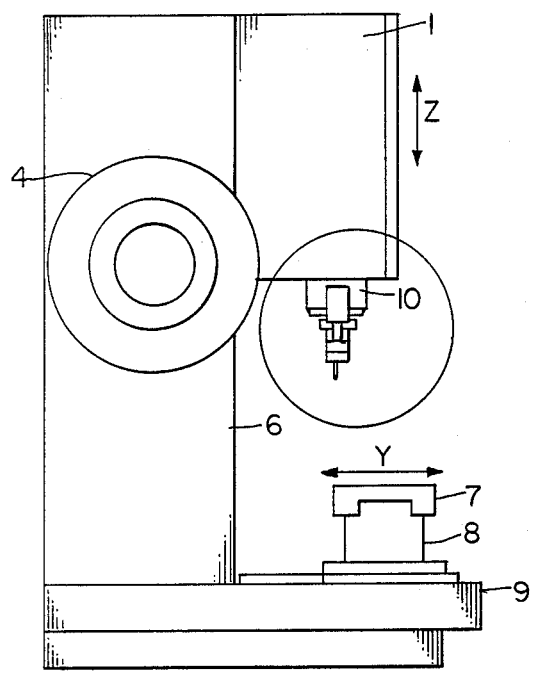
FIG. 1 is a side elevation of a machining center showing my invention inserted in the spindle.
Figure 2:
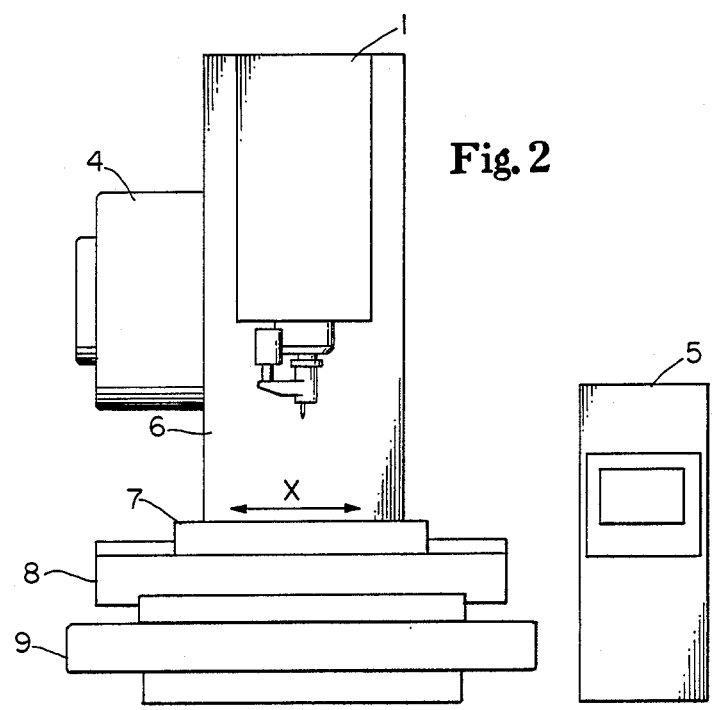
FIG. 2 is a front elevation of a machining center showing my invention from a different view.

Referring to the drawings, I show in FIGS. 1 and 2 a vertical spindle machining center having a base 9 supporting a moving saddle 8. The saddle motion is referred to as the Y axis. The saddle 8 supports the workholding table 7. The table motion is referred to as the X axis. The base 9 also supports the machine column 6. Mounted to column 6 is the automatic tool changer 4.

Column 6 also provides a slidable mounting surface for the spindle headstock 1.

Figure 3:
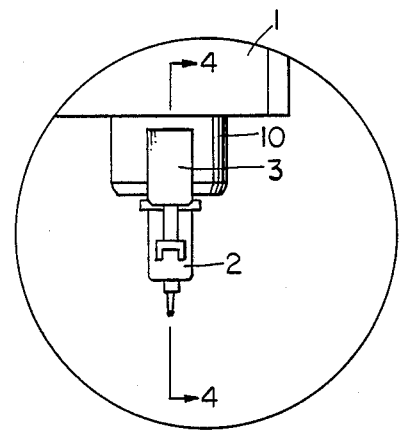
FIG. 3 is an enlarged view of the spindle area showing my invention in more detail.

The vertical motion of the headstock 1 is referred to as the Z axis. Referring now to FIG. 3, I show spindle housing 10 at the lower portion of headstock 1. Mounted to spindle housing 10 is transducer unit 3. Probing device 2 is retained in spindle and is engaged with transducer unit 3. Referring again to FIG. 2, I show the CNC control 5.

Figure 4:
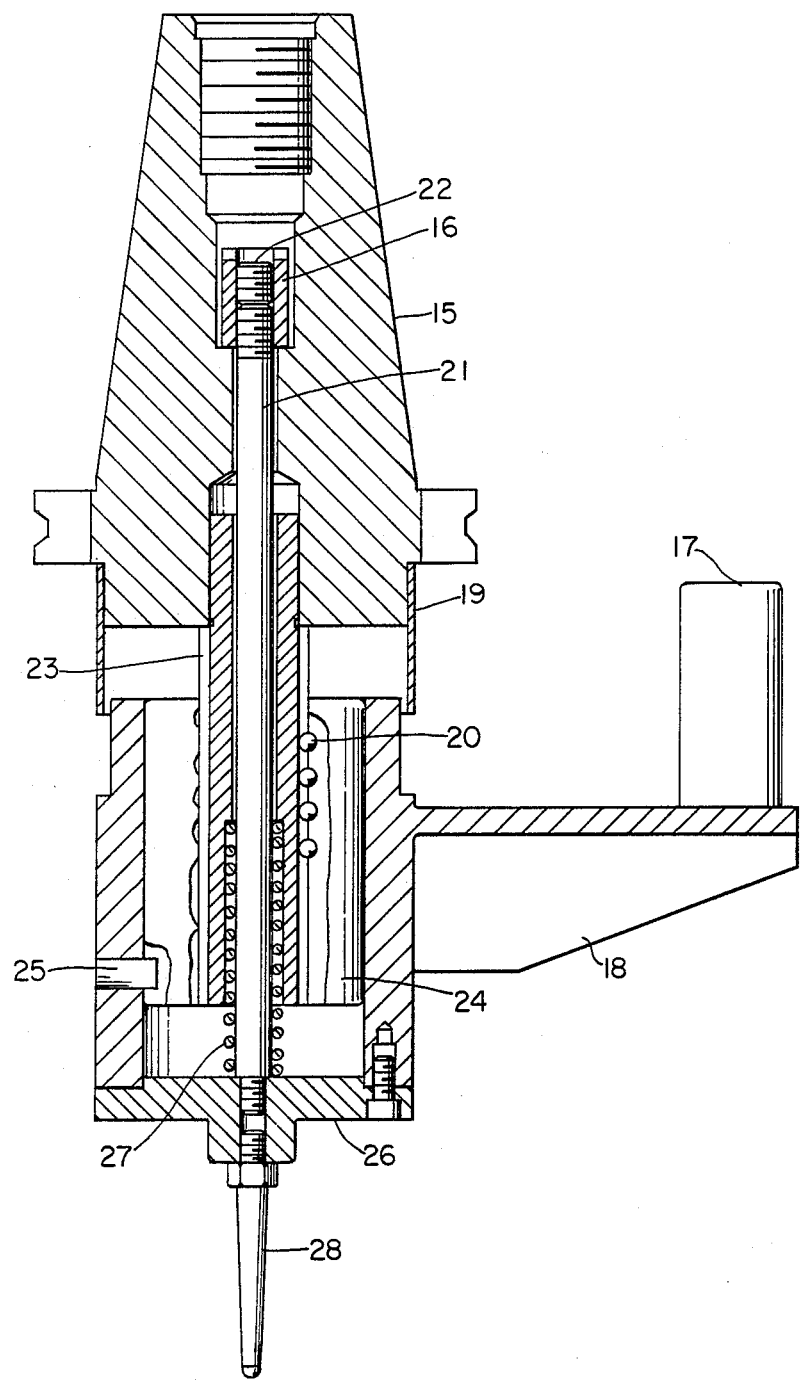
FIG. 4 is a section taken along the lines 4—4 of FIG. 3 showing the probing device of my invention arranged for stylus deflection parallel to the probe center line.

Referring to FIG. 4, I show a section through a probing device arranged for stylus deflect parallel to the probe center line.

Figure 10:
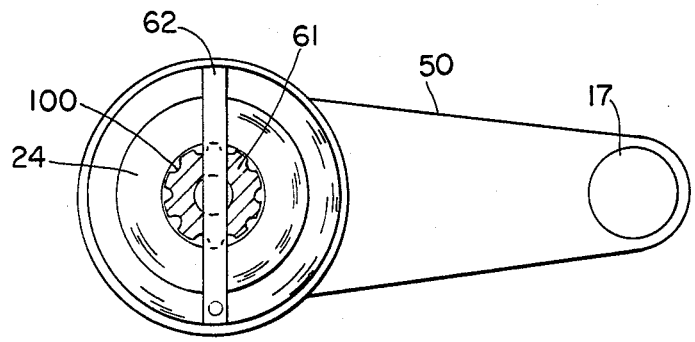
FIG. 10 is a section taken along the line 10—10 of FIG. 6.

The probe device comprises a spline shaft 23 mounted to support body 15. Spline bushing 24 slides on shaft 23 by means of balls 20 operating in spline groove 100 (FIG. 10). The preloaded fit of ball bushing 24 in relation to spline shaft 23 provides an anti-friction mounting. Torque arm 18 is secured to spline bushing 24 and retained axially by pin 25. Stylus mounting head 26 is secured to torque arm 18 and arranged to support stylus 28. Spring guide 21 is fastened to stylus mounting head 26. Probe preload spring 27 is arranged to operate between stylus mounting head 26 and spline shaft 23. Spring guide 21 limits travel and determines position of torque arm 18 by means of adjusting nut 16 and lock screw 22.

In operation the spindle is traversed toward the work surface until stylus 28 contacts the work surface. This action causes stylus mounting head 26, torque arm 18 and operating plunger 17 to move relative to spline shaft 23, support body 15 and spindle housing 10 shown on FIG. 3. Since transducer unit 3 is secured to spindle housing 10, the movement will displace components in the transducer unit 3 causing the signal to occur as previously described.

Figure 5:
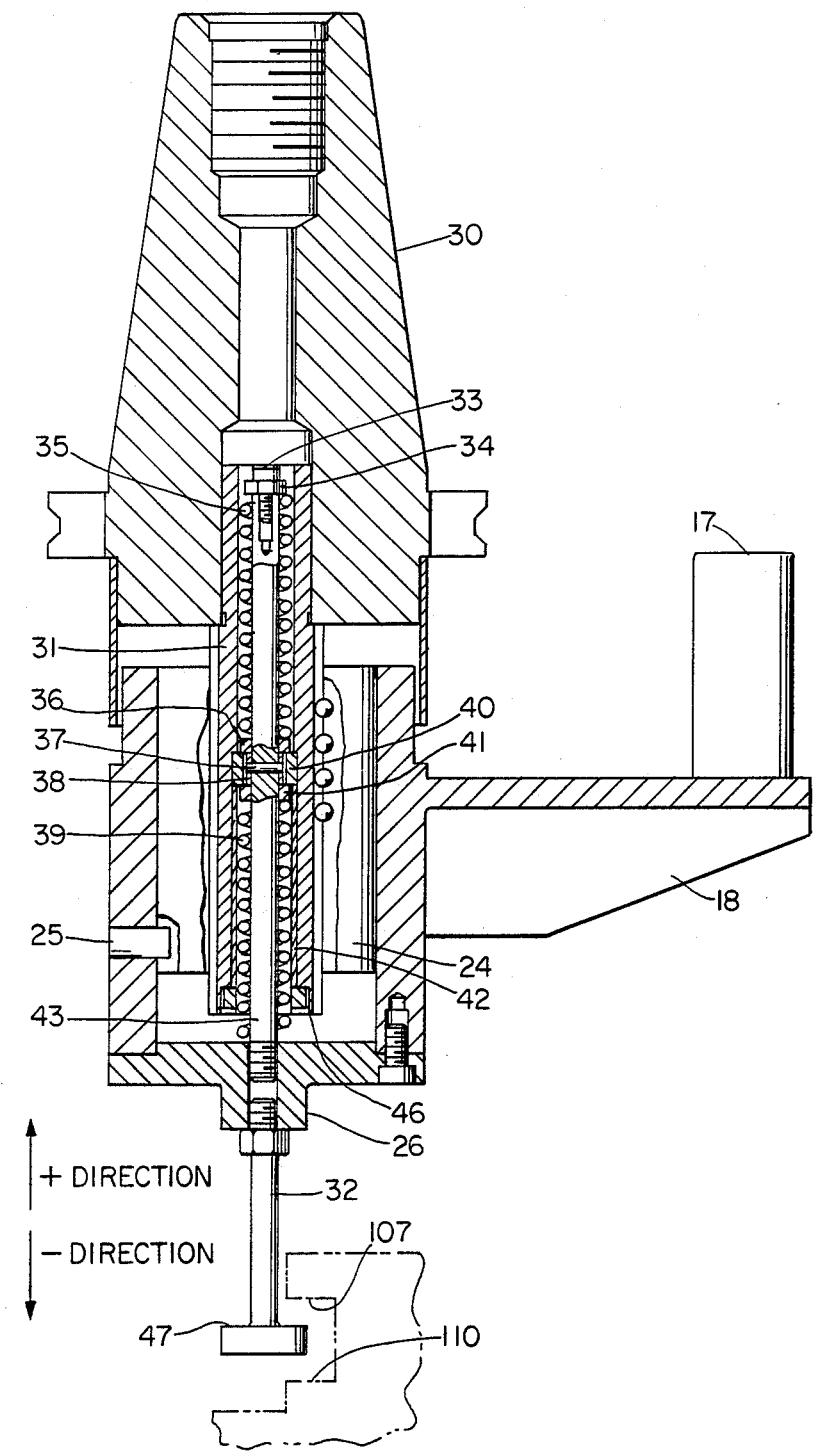
FIG. 5 is a section taken along the lines 4—4 of FIG. 3 showing the probing device of my invention arranged for stylus deflection parallel to the probe center line in both the plus and minus direction.
Figure 16:
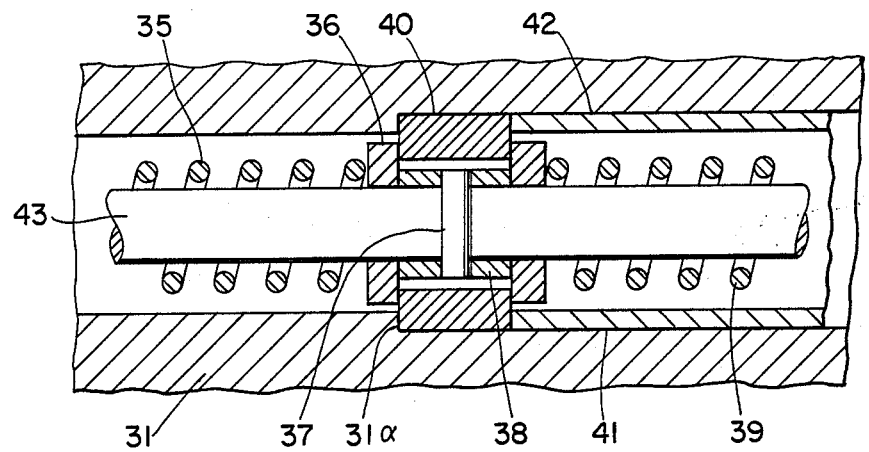
FIG. 16 is an enlarged area of a portion of FIG. 5.

Referring to FIG. 5, I show a probing device arranged for stylus deflection in both the plus and minus directions parallel to the probe center line. The probe device comprises a spline shaft 31 mounted to support body 30. Torque arm 18 is secured to spline bushing 24 and retained axially by pin 25. Stylus mounting head 26 is secured to torque arm 18 and is arranged to support stylus 32. Spring guide shaft 43 is fastened to mounting head 26. Mounting head upper locating spring 35 and mounting head lower locating spring 39 are located in shouldered bore in spline shaft 31. (FIG. 16). Outer center bushing 40 is clamped against spline shaft shoulder by sleeve 42 and clamp nut 46. Inner center bushing 38 is pinned to spring guide shaft 43 by pin 37. Upper locating spring 35 is retained between upper sliding spring collar 36 and upper spring washer 34 by spring clamp screw 33. The lower locating spring 39 is contained by lower sliding spring collar 41 and stylus mounting head 26. When the mounting head 26 is at rest, i.e. when stylus 32 is not in contact with any work surface, the upper spring 35 whose compressive force is contained between clamp screw 33 and pinned inner bushing 38 provides a positive location for mounting head 26 in the minus direction by sliding collar 36 acting against clamped outer bushing 40. The lower spring 39 whose compressive force is contained between mounting head 26 and pinned inner bushing 38 provides a positive location for mounting head 26 in the plus direction by sliding collar 41 acting against clamped outer bushing 40. Inner bushing 38 and outer bushing 40 are of equal lengths.

In operation the spindle is traversed toward the work surface 110 until the stylus 32 contacts work surface. This action will cause stylus mounting head 26, torque arm 18 and operating plunger 17 to move relative to spline shaft 31, support body 30 and spindle housing 10 shown in FIG. 3. During the initial insertion of the support body 30 into the spindle and before the probe cycle begins, the end of plunger 17 will displace components in transducer unit 3 (FIG. 3) at a fixed distance. An electronic null will thus be established. Therefore the movement caused by stylus 32 contacting work surface 110 will displace the components in transducer unit 3 causing the signals to occur as previously described. When the spindle is retracted in a probing cycle established to locate the under side of a work piece, stylus face 47 will contact work surface 107 again causing components in transducer unit 3 to be displaced thereby causing signals to occur that determine work surface location.

Upper locating spring 35 is preloaded sufficiently between spring washer 34 and sliding spring collar 36 so that no deflection of spring 35 will occur during initial insertion of operating body 30 into the machine spindle to cause operating plunger 17 to displace components in transducer unit 3 for establishing a null position.

Figure 6:
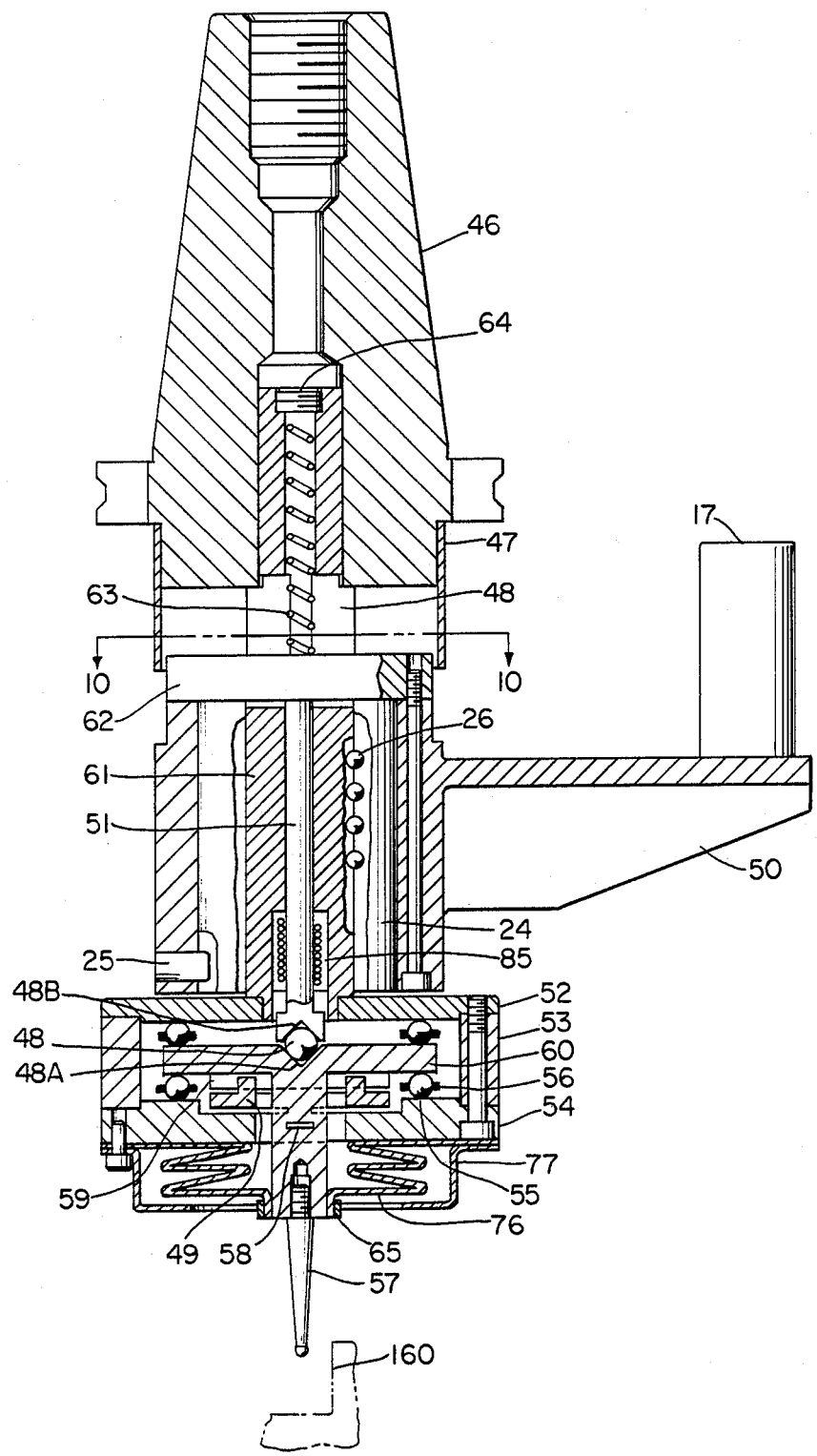
FIG. 6 is a section taken along the lines 4—4 of FIG. 3 through the probe device of my invention arranged for stylus deflection perpendicular to the probe center line.

Referring now to FIG. 6, I show a probing device arranged for stylus deflection perpendicular to the probe center line. The probe device comprises a spline shaft 61 mounted to support body 46. Torque arm 50 is secured to ball bushing 24 and retained by pin 25. Torque arm bar 62 is secured to torque arm 50 and operates in spline shaft slot 48 between probe preload spring 63 and center shaft 51. Upper parallel plate 52 is secured to spline shaft 61. Lower parallel plate 54 and plate spacer 53 are secured to upper parallel plate 52. Stylus mounting head 60 is supported between upper parallel plate 52 and lower parallel plate 54 by ball bearings 55 retained in the spacer ring 56. Orientation retention ring 49 has upper keys that operates in slot 59 of stylus mounting head 60 and lower keyes that operate in slot 58 of lower parallel plate 54. This assembly permits mounting head 60 to move freely in a plane perpendicular to the probe center line, but is prevented from rotating about the probe center line. Stylus 57 is secured to stylus mounted head 60. Bellows 76 is clamped to mounting head 60 by clamp 65 and cover 77 secured to lower parallel plate 54. Stylus mounting head 60 is retained in a neutral position by pressure on the precision ball 48 operating in 90° tapered hole 48a of stylus mounting head 60 and 90° tapered hole 48b of center shaft 51 from preload spring 63 acting on center shaft 51 by means of torque arm bar 62.

In operation the spindle is traversed toward work surface 160 in a direction perpendicular to the probe center line. When the probe stylus 57 contacts work surface 160 the stylus mounting head 60 will be displaced from its neutral position. This action will cause 90° tapered hole 48a in stylus head 60 to displace center shaft 51 axially by means of ball 48 rolling on ramp of the 90° hole 48a in stylus head 60 and 90° hole 48b in the center shaft 51. This axial displacement of the center shaft 51 will move torque arm bar 62, torque arm 50 and plunger 17 relative to spindle shaft 61, support body 46 and spindle housing 10. (FIG. 3). Since transducer unit 3 is secured to spindle housing 10 this axial movement will displace components in transducer unit 3 causing the signals to occur as previously described.

Figure 7:
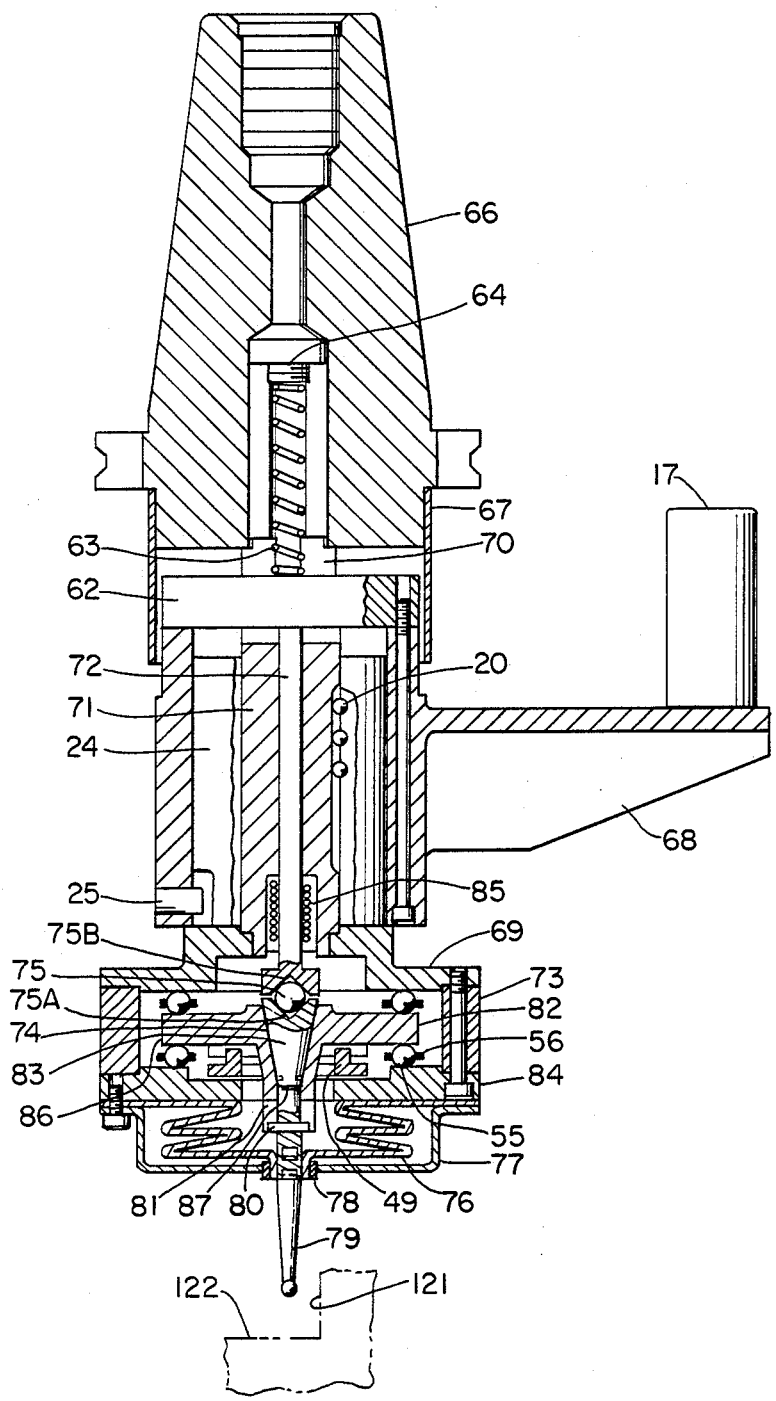
FIG. 7 is a section taken along the lines 4—4 of FIG. 3 through the probe device of my invention arranged for stylus deflection perpendicular and parallel to the probe center line.

Referring to FIG. 7, I show a probing device arranged for stylus deflection perpendicular and parallel to the probe center line. The probe device comprises a spline shaft 71 mounted to support body 66. Torque arm 68 is secured to ball spline bushing 24 by means of a tight fit and retained by pin 25. Torque arm bar 62 is secured to torque arm 68 and operates in spline shaft slot 70 between probe preload spring 63 and center shaft 72. Upper parallel plate 69 is secured to spline shaft 71. Lower parallel plate 84 and plate spacer 73 are secured to upper parallel plate 69. Disc 82 is supported between upper parallel plate 69 and lower parallel plate 84 by ball bearing 55 retained in spacer ring 56.

Orientation retention ring 49 has upper keys that operate in slot 86 of disc 82 and lower keys that operate in slot 87 of lower parallel plate 84. This assembly permits disc 82 to move in a plane perpendicular to the probe center line but is prevented from rotating about the probe center line. Stylus 79 is secured to mounting head 83. Stylus mounting head 83 is located in disc 82 by means of steep taper 74. Taper 74 is sufficiently steep to provide a radially rigid fit between disc 82 and mounting head 83 when the stylus is in the spring biased neutral position. This eliminates any looseness when the stylus is deflected in a direction perpendicular to the probe center line. Stylus mounting head 83 is prevented from rotating by means of pin 80 operating in disc slot 81. Taper 74 is self releasing in a direction parallel to the probe center line thereby allowing free movement when stylus 79 is deflected in that direction. Bellows 76 is clamped to stylus mounting head 83 by clamp 78 and by cover 77 and is secured to the lower parallel plate 84.

Stylus mounting head 83 is retained in a neutral position in a plane perpendicular to the probe center line by pressure on ball 75 operating in 90° hole 75a of stylus mounting head 83 and 90° tapered hole 75b of center shaft 72 from preload spring 63 acting on center shaft 71 by torque arm bar 62 center shaft 72 which is rigidly supported in ball bushing 85. Pressure from preload spring 63 also retains the stylus mounting head 83 in a neutral position in a plane parallel to the probe center line by seating the stylus head 83 in steep taper 74. In operation the spindle is traversed toward work surface 122 for locating a surface perpendicular to the probe center line. When stylus 79 contacts work surface 122 this stylus mounting head 83 is displaced from its neutral position causing center shaft 72 to be displaced axially by means of ball 75: Center shaft 72 will displace bar 62 torque arm 68 and plunger 17 relative to spline shaft 71 support body 66 and spindle housing 10 shown in FIG. 3. Since transducer unit 3 is secured to spindle housing 10 the movement will displace components in the transducer unit 3 causing the signals to occur as previously described.

In another operating mode the spindle is traversed toward work surface 121 for locating a surface parallel to the spindle center line. When stylus 79 contacts work surface 121 disc 82 is immediately displaced by pressure from stylus head 83 through steep taper 73. This displacement will cause 90° tapered hole 75a in stylus head 83 to displace center shaft 72 axially by means of ball 75 rolling up ramp of 90° hole 75a in stylus head 83 and 90° hole 75b in center shaft 72. This axial displacement of center shaft 72 will move torque arm bar 62, torque arm 68 and plunger 17 relative to spline shaft 71, support body 66 and spindle housing 10 shown in FIG. 3. Since transducer unit 3 is secured to spindle housing 10, this axial movement will displace components in transducer unit 3 causing the signals to occur as previously described.

Figure 8:
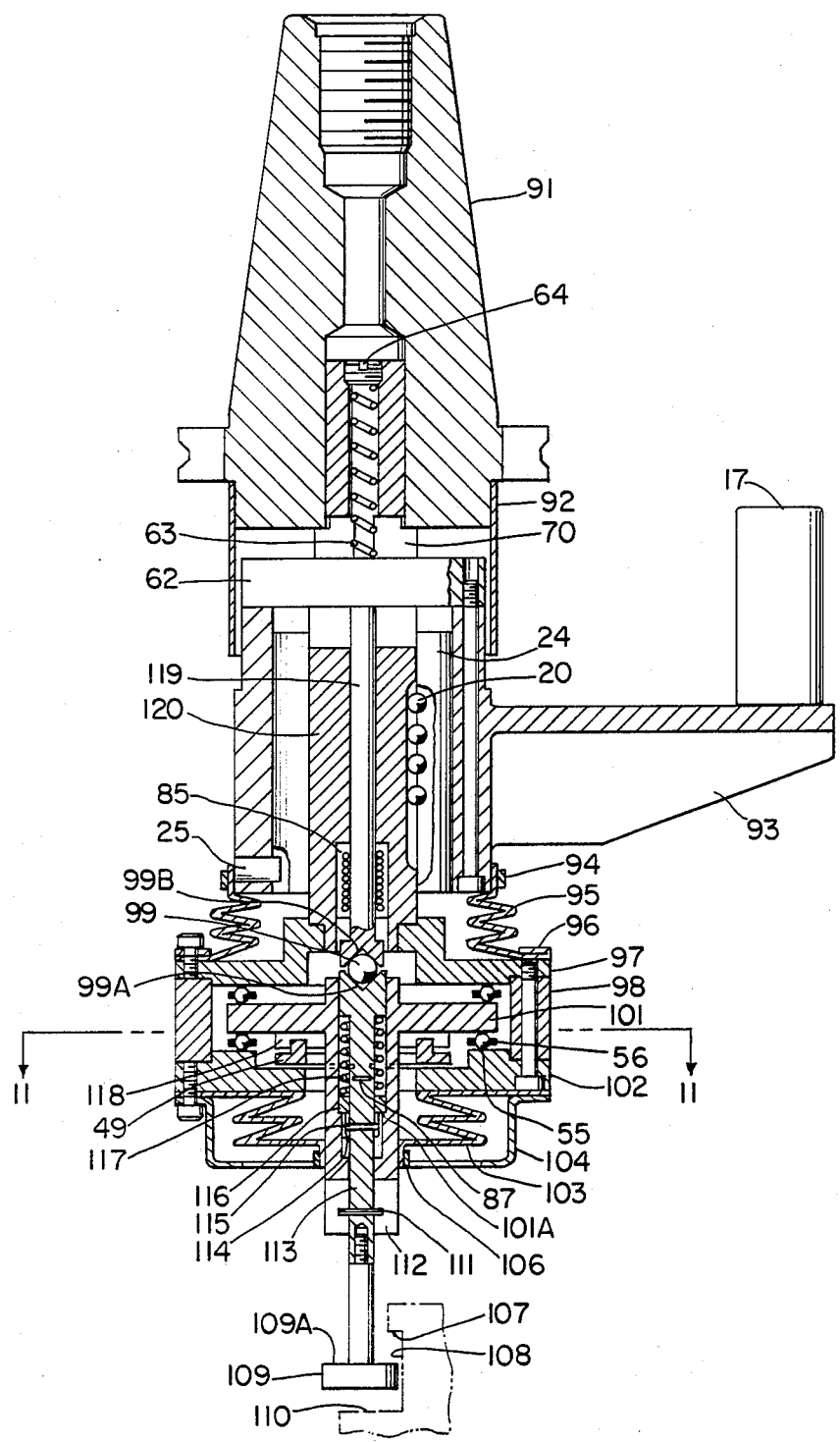
FIG. 8 is a section taken along the lines 4—4 of FIG. 3 through the probing device of my invention arranged for stylus deflection perpendicular to the probe center line and also for stylus deflection parallel to the spindle centerline in both the plus and minus directions.

Referring now to FIG. 8, I show a probing device arranged for stylus deflection perpendicular and parallel to the probe center line in both the plus and minus directions. The probe device comprises a spline shaft 120 mounted to support body 91. Torque arm 93 is secured to ball spline bushing 24 and retained by pin 25. Torque arm bar 62 is secured to torque arm 93 and operates in spline slot 70 between preload spring 63 and center shaft 119. Upper parallel plate 97 is secured to spline shaft 120. Lower parallel plate 102 and plate spacer 98 are secured to upper parallel plate 97. Disc 101 is supported between upper parallel plate 97 and lower parallel plate 102 by ball bearings 55 retained in the spacer ring 56.

Orientation ring 49 has upper keys that operates in slot 118 of disc 101 and lower keys that operate in slot 87 of lower parallel plate 102. This assembly permits discs 101 to move freely in a plane perpendicular to the probe center line but is prevented from rotating about the probe center line. Stylus 109 is secured to mounting head 113, which is prevented from rotating by pin 111 operating in slot 112. Stylus mounting head 113 is located radially in disc 101 by means of a precision fit between the mating inside diameters of disc 101 and mounting head 113 respectively. Stylus mounting head 113 is located axially by means of lower locating spring 117 compressed between the shoulder of mounting head 113 and sliding collar 116 contained by sleeve 114 fastened to mounting head 113 by pin 115, sliding collar 116 actually determines axial locations in a neutral position by being seated against shoulder 101a of disc 101. Pressure from preload spring 63 through bar 62, center shaft 119 ball 99 and mounting head 113 maintains collar 116 against shoulder 101a. The compressed load in lower locating spring 117 is greater than the preload force of spring 63. Therefore no additional deflection occurs in locating spring 117 when in the neutral position. Stylus mounting head 113 and disc 101 are retained in a neutral position in a plane perpendicular to the probe center line by pressure on precision ball 99 operating in 90° tapered hole 99a of stylus mounting head 113 and 90° tapered hole 99b of center shaft 119 from preload spring 63 acting on center shaft 119 by the torque arm bar 62.

Center shaft 119 is radially located by preloaded ball bushing 85. Bellows 95 is secured to torque arm 93 by clamp 94 and to upper parallel plate 97 by clamp 96. Bellows 103 is secured to lower parallel plate 102 by bellows cover 104 and to mounting head 113 by clamp 106.

During the initial insertion of support body 91 into the spindle and before the probe cycle begins, the end of plunger 17 will displace components in transducer unit 3 FIG. 3 a fixed distance. An electronic null will be established at this point by the CNC control.

In operation the spindle is traversed toward work surface 110 until stylus 109 makes contact. This action will cause stylus mounting head 113, ball 99, center shaft 119, bar 62, torque arm 93 and operating plunger 17 to move relative to spline shaft 120, support body 91 and spindle housing 10 shown on FIG. 3. Preload spring 63 is compressed an additional amount. Lower locating spring 117 has no effect because its forces are contained by pin 115. Lower locating spring 117 does move with mounting head 113, collar 116 moves away from shoulder 101a. This movement will displace the components in transducer unit 3 causing the signals to occur as previously described.

When the spindle is retracted in a probing cycle established to locate the under side of a work surface stylus face 109a will contact work surface 107. This will cause stylus mounting head 113 to compress lower locating spring 117 permitting preload spring 63 to move bar 62, center shaft 120, ball 99, torque 93 and plunger 17 to move relative to spline shaft 120, support body 91 and spindle housing 10 shown on FIG. 3. This action will displace the components in transducer unit 3 causing the signals to occur as previously described.

In another operating mode the spindle is traversed toward work surface 108 for locating a surface parallel to the spindle center line. When stylus 109 contacts work surface 108 disc 101 is displaced by pressure from stylus mounting head 113. This displacement will cause 90° taper hole 99a in stylus mounting head 113 to displace center shaft 119 axially by means of ball 99 rolling up ramp 90° hole 99a in stylus head 113 and 90° tapered hole 99b in center shaft 119. This axial displacement of center shaft 119 will move torque arm bar 62, torque arm 93 and plunger 17 relative to spline shaft 120, support body 91 and spindle housing. (FIG. 3)

Since transducer unit 3 is secured to spindle housing 10, this axial movement will displace components in transducer unit 3 causing the signals to occur as previously described.

Figure 9:
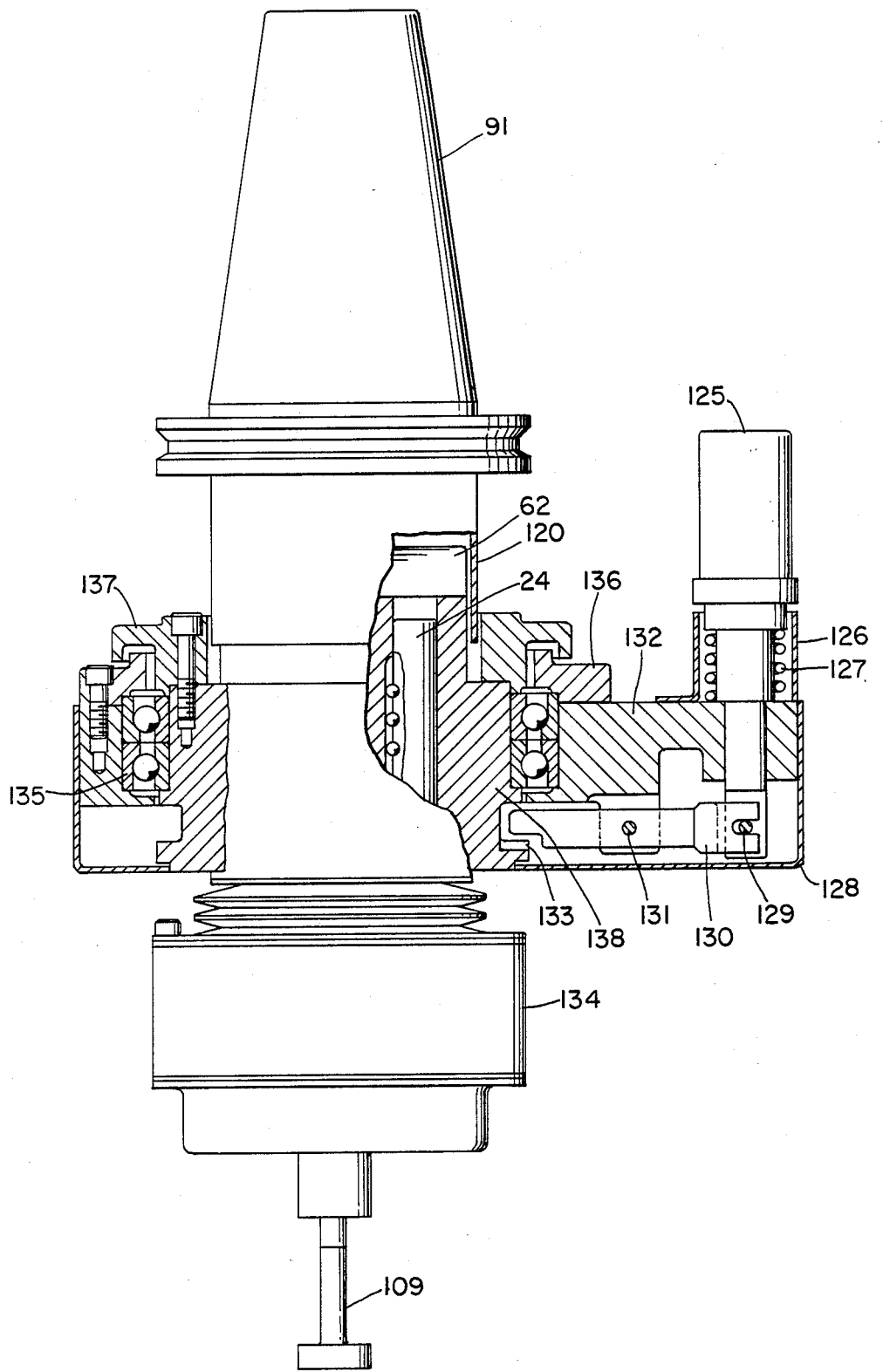
FIG. 9 is a partial section taken along the lines of 4—4 of FIG. 3 through a typical probing device of my invention showing a bearing mounted torque arm assembly that permits probing to occur in more than one angular position of the spindle.

Referring now to FIG. 9, I show a section of a probing device as described in FIG. 8 arranged to permit probe body rotation with a stationary torque arm. This is desirable if the machine spindle is capable of using multiple discreet radial position in the probing process.

All of the internal components remain the same as with a stationary torque arm. Torque arm 93, FIG. 8 is replaced with torque arm hub 138 of FIG. 9, mounted to torque arm hub 138 are precision preloaded bearings 135 supporting torque arm 132. Bearings 135 are retained in hub 138 by cap 137 and in torque arm 132 by cap 136. Plunger 125 is shown in a seated position compressing spring 127 and releasing orientation retention lever 130 from orientation slot 133 on hub 138. Lever 130 is controlled by operating pin 129 in plunger 125 and pivots about pivot pin 131 in torque arm 132. When plunger 125 is seated (as shown) by components in transducer unit 3, FIG. 3 then probe body 91 and related components are free to rotate with spindle. Plunger 125 is free to assume the extended position determined by spring 127 when lever 130 engages slot 133 thereby maintaining a fixed oriented relationship between the torque arm 132 and hub 138. In operation the probing device is inserted in the machine spindle 151 (FIG. 15) which also causes plunger 125 to be engaged in transducer unit 3 causing plunger 125 to compress spring 127 and disengage lever 130 from slot 133. The spring forces in transducer unit 3 are higher than the forces required to compress spring 127. After lever 130 is disengaged the probing cycles that have previously been described can commence.

Referring now to FIG. 10, I show a section through spline shaft 61 showing the spline grooves 100 in which balls 20 of ball spline bushing 24 operate. Torque arm bar 62 is shown secured to torque arm 50.

Figure 11:
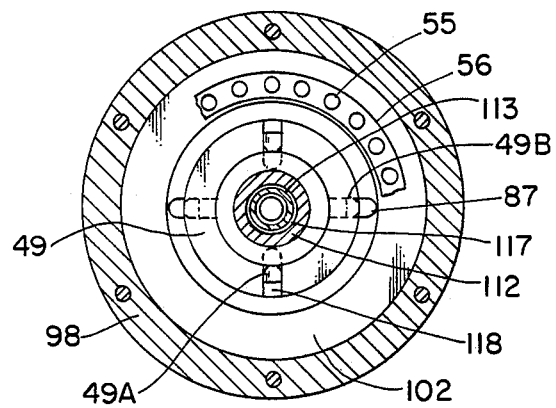
FIG. 11 is a section taken along the line 11—11 of FIG. 8.

Referring now to FIG. 11, I show in detail the probe head orientation retention assembly consisting of orientation retention ring 49 having upper keys 49a engaged in slot 118 of disc 101 (FIG. 8) and lower keys 49b engaged in slot 87 of lower parallel plate 102. Also shown is lower locating spring 117 and probe mounting head 113 in the bore of disc 101.

Figure 12:
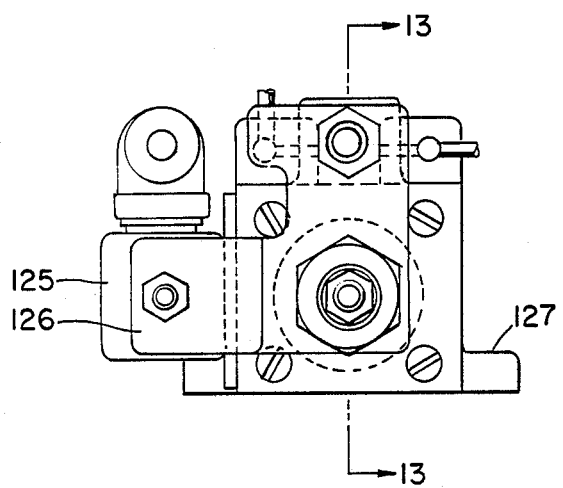
FIG. 12 is an end view of the transducer unit of my invention.

Referring now to FIG. 12, I show an end view of a transducer unit comprised of transducer body 125 secured to cylinder housing 127.

Figure 13:
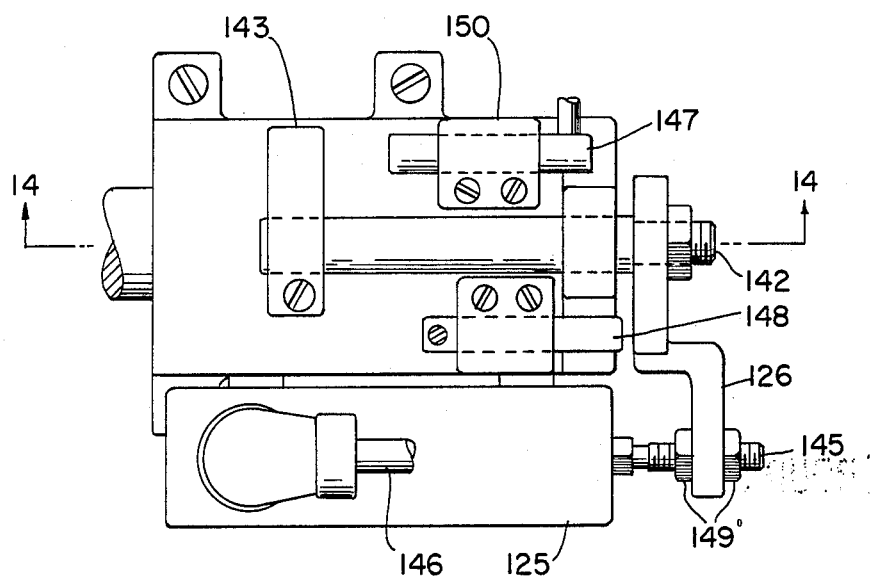
FIG. 13 is a plan view of the transducer unit.
Figure 14:
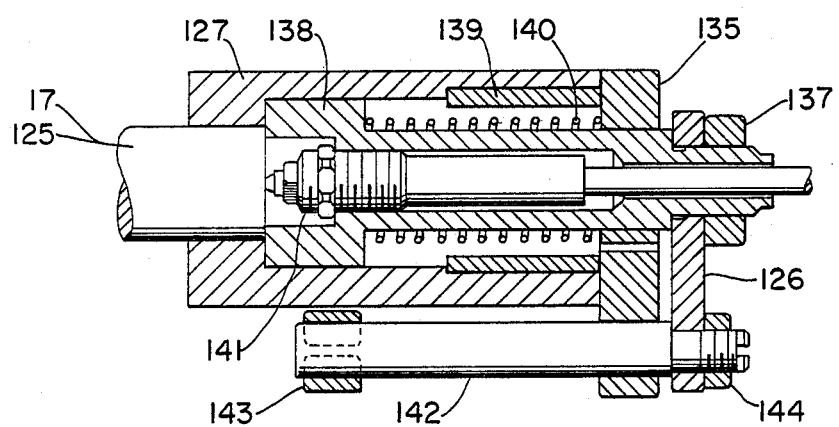
FIG. 14 is a section taken along line 13—13 of FIG. 13.

Referring to FIG. 14, I show a section through a transducer unit having piston 138 biased by spring 140 operating in the bore of cylinder housing 127. The initial compressed load of spring 140 exceeds the force required for plunger 17 to actuate tool present switch 141 and for plunger 125 to actuate tool present switch 141 and also to compress spring 127 shown in FIG. 9. Yoke 126 is secured to piston 138 by nut 137. Yoke 126 is secured to piston guide 142 by nut 144. Limit switch actuator 143 (FIG. 13) is adjustably secured to piston guide 142.

Referring now to FIG. 13 and 14, I show transducer body 125 secured to cylinder housing 127, transducer slider 145 is adjustably secured to yoke 126 by jam nuts 149. Travel proximity limit switches 147 and 148 are adjustably secured to cylinder body 127 and operated by actuator 143 and yoke 126 respectively. Cable 146 transmits transducer information to CNC control 5.

Figure 15:
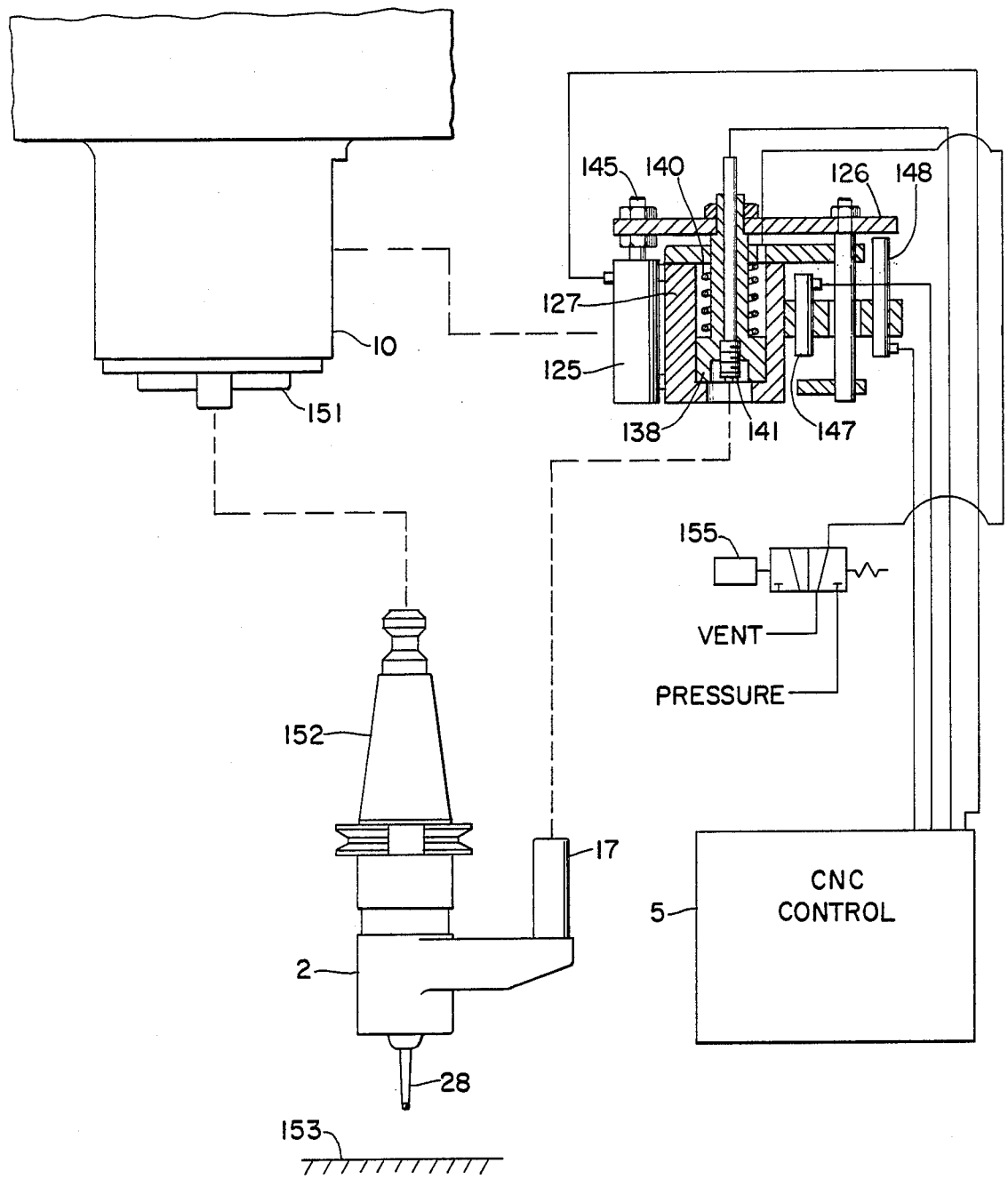
FIG. 15 is a mechanical-electrical schematic of my invention.

Referring to FIG. 15, I show a mechanical, electrical schematic comprising a spindle housing 10 with spindle 151 arranged to retain taper 152 of typical probe device 2 having stylus 28 and plunger 17. Plunger 17 trips tool present switch 145 when probe device 2 is inserted in spindle 151.

In operation spindle housing 10 is advanced toward work surface 153 until stylus 28 contacts work surface 153, which causes probe device 2 to telescope until zero feed rate is established. During distance required to establish zero feed rate, plunger 17 displaces piston 138 moving yoke 126 and slider 145 in relation to transducer body 125 which is secured to cylinder housing 127. Housing 127 is secured to spindle housing 10.

The movement of transducer slider 145 will cause transducer 125 to signal CNC control 5 that the probe stylus 28 has contacted work surface 153. The CNC control may use this signal in any of the following ways.

Since the transducer is in a null or zero position prior to probing cycle the initial contact of stylus 28 will put the transducer in an out of null condition. This signal triggers the probe compatible circuits in the CNC control which are designed to use this signal for axis position location. In this mode the spindle axis will over shoot and reverse its direction at a lower feed rate and again signal a null condition as stylus 28 leaves work surface 153. This final null signal is used to establish axis position. Previous calibrations will then be used to calculate actual work surface location. An alternative method is to have the CNC control 5 decelerate the axis motion in a fixed distance by using the transducer signal to control the axis feed during deceleration until that fixed distance is reached. The transducer position is then algebraically added to the axis position to determine work surface location.

Another alternate method is to let normal deceleration occur after probe contact until zero axis velocity is reached. The transducer position is algebraically added to axis position to determine work surface location.

I claim:

1. In a machining center having computer numerical control including multiple axis of motion, a probing device, a work table, a spindle, said spindle and said axis of motion of the machine controlled by said computer numerical control, said probing device carried by said spindle comprising a spindle mounted support body, a spring biased stylus mounting head carried by said support body, a stylus in said stylus mounting head, said stylus and said mounting head movable relative to said support body, a work piece, a machine mounted electronic variable displacement transducer unit arranged to be actuated by relative motion of said mounting head when said stylus is deflected by a workpiece mounted on said work table while said probing device is moving in a minus direction parallel to the axis of said spindle, said transducer unit having electronic coupling means to the axis feed rate of the computer numerical control for controlling spindle advance from rapid traverse to zero feed rate, said transducer unit to trigger position detection circuit of said computer numerical control when relative motion begins between said stylus mounting head and said support body to track said relative motion until zero velocity is reached, whereby said output of said position detection circuit is processed by said computer numerical control to determine relative position of said work piece to said stylus when said probing device is moved to a minus direction parallel to the axis of said spindle until said stylus is deflected by said work piece.

2. The device described in claim 1 for defining the contour of said work piece relative to a plane perpendicular to the axis of said spindle when said stylus is moved along said work piece in a direction perpendicular to the axis of said spindle.

3. In a machining center having computer numerical control including multi axis of motion, a probing device, a work table, a spindle, said spindle and said axis of motion of the machine controlled by said computer numerical control, said probing device carried by said spindle comprising a spindle mounted support body, a spring biased stylus mounting head, a stylus in said mounting head, said stylus and said mounting head movable relative to said support body, a preloaded anti-friction mounted torque arm slidably mounted to said support body, said stylus mounting head secured to said torque arm, a work piece, a machine mounted electronic variable displacement transducer unit actuated by said torque arm when said stylus contacts said work piece mounted on said work table while moving in a minus direction parallel to the axis of said spindle, said electronic variable displacement transducer unit having electronic coupling means to the axis feed rate of the computer numerical control for controlling spindle advance from rapid traverse to zero feed rate, said transducer unit to trigger position detection circuit of said computer numerical control when relative motion begins between said stylus mounting head and said support body and tracks said relative motion until zero velocity is reached whereby said output of said position detection circuit is processed by said computer numerical control to determine relative positions of said work piece to said stylus when said stylus is moved in a minus direction parallel to the axis of said spindle until deflected by said work piece.

4. In a machining center having computer numerical control including multiple axis of motion, a probing device, a work table, a spindle, said spindle and said axis of motion of the machine controlled by said computer numerical control, said probing device carried by said spindle comprising a spindle mounted support body, a spring biased stylus mounting head, a stylus in said mounting head, said stylus and said mounting head movable relative to said support body, means for retaining opposed preload forces to provide positive neutral position of said stylus mounting head, a work piece, a machine mounted electronic variable displacement transducer unit actuated by relative motion of said mounting head when said stylus contacts the surface of said work piece mounted on said work table while moving in a plus or minus direction parallel to the axis of said spindle, said electronic variable displacement transducer unit having electronic coupling means to the axis feed rate of the computer numerical control for controlling spindle advance from rapid traverse to zero feed rate, said transducer unit to trigger position detection circuit of said computer numerical control when relative motion begins between said stylus mounting head and said support body to track said relative motion until zero velocity is reached, whereby said output of said position detection circuit processed by said computer numerical control to determine relative position of said work surface to said stylus when said stylus is moved in a plus or minus direction parallel to the axis of said spindle until deflected by said work surface.

5. In a machining center having computer numerical control including multiple axis of motion, a probing device, a work table, a spindle, said spindle and said axis of motion of the machine controlled by said computer numerical control, said probing device carried by said spindle comprising a spindle mounted support body, a spring biased stylus mounting head, a stylus in said mounting head, said stylus and said mounting head movable relative to said support body, an upper and lower locating spring, a spring guide secured to said stylus mounting head arranged to retain opposed preload force of said upper and lower locating springs between positive stops on said spring guide, said upper and lower locating springs being mounted in said support body to provide a positive vertical position of said spring biased stylus mounting head, a preloaded anti-friction mounted torque arm slidably mounted to said support body, said spring biased stylus mounting head secured to said torque arm, a workpiece, a machine mounted electronic variable displacement transducer unit actuated by said torque arm when said stylus contacts the surface of a workpiece mounted on said work table while moving in a plus or minus direction parallel to the axis of said spindle, said electronic variable displacement transducer unit having electronic coupling means to the axis feed rate of the computer numerical control for controlling spindle advance from rapid traverse to zero feed rate, said transducer unit to trigger position detection circuit of said computer numerical control when relative motion begins between said stylus mounting head and said support body to track said relative motion until zero velocity is reached, whereby said output of said position detection circuit is processed by said computer numerical control to determine relative position of said work piece to said stylus when said stylus is moved in a plus or minus direction parallel to the axis of said spindle until deflected by said work surface.

6. In a machining center having computer numerical control including multiple axis of motion, a probing device, a work table, a spindle, said spindle and said axis of motion of the machine controlled by said computer numerical control, said probing device carried by said spindle comprising a spindle mounted support body, a stylus mounting head movable relative to said support body, in a direction perpendicular to the axis of said spindle, a stylus in said mounting head, a workpiece, a machine mounted electronic variable displacement transducer unit, a means for actuating said machine mounted electronic variable displacement transducer unit when said stylus is deflected by the surface of said workpiece mounted on said work table when said probing device is moved in a direction perpendicular to the axis of the spindle, said transducer unit having electronic coupling means to the axis feed rate of the computer numerical control for controlling spindle advance from rapid traverse to zero feed rate, said transducer unit to trigger axis position detection circuit of said computer numerical control when relative motion begins between said stylus mounting head and said support body to track said relative motion until zero velocity is reached, said output of said position detection circuit processed by said computer numerical control to establish relative position of said stylus to said workpiece when said probing device is moved in a direction perpendicular to the axis of said spindle until said stylus is deflected by said workpiece.

7. The device in claim 6 for defining the contour of said work piece relative to a plane parallel to the axis of said spindle when said stylus is moved along said work piece in a direction perpendicular to the axis of said spindle.

8. In a machining center having computer numerical control including multiple axis of motion, a probing device, a work table, a spindle, said spindle and said axis of motion of the machine controlled by said computer numerical control, said probing device carried by said spindle comprising a spindle mounted support body, a preloaded anti-friction bearing mounted rigid disc type stylus mounting head having a cam, a ball carried in said cam in said stylus mounting head, a spring loaded center shaft, a cam in said spring loaded center shaft for receiving said ball to determine a neutral position, a stylus in said mounting head, any deflection to said stylus in a direction perpendicular to the axis of said spindle to cause said ball operating in said cams to deflect said center shaft an amount equal to the deflection of said stylus, a preloaded antifriction mounted torque arm slidably mounted to said support body for actuating a machine mounted electronic variable displacement transducer unit, a workpiece, said torque arm being actuated by said spring loaded center shaft when said stylus is deflected by the surface of said workpiece mounted on said work table when said probing device is moved in a direction perpendicular to the axis of said spindle, said stylus remains parallel to the axis of said spindle after stylus deflection, a floatably mounted orientation retention ring keying said rigid disc to said support body, said transducer unit having electronic coupling means to the axis feed rate of the computer numerical control for controlling spindle advance from rapid traverse to zero feed rate, said transducer unit to trigger position detection circuit of said computer numerical control when relative motion begins between said stylus mounting head and said support body to track said relative motion until zero velocity is reached, whereby said output of said position detection circuit is processed by said computer numerical control to establish relative position of said stylus to said workpiece when said probing device is moved in a direction perpendicular to the axis of said spindle until said stylus is deflected by said work piece.

9. In a machining center having computer numerical control including multiple axis of motion, a probing device, a work table, a spindle, said spindle and said multiple axis of motion of the machine controlled by said computer numerical control, said probing device carried by said spindle comprising a spindle mounted support body, a stylus mounting head movable relative to said support body in a plus direction parallel to the axis of said spindle and in a direction perpendicular to the axis of said spindle, a stylus in said stylus mounting head, a workpiece, a means for actuating a machine mounted electronic variable displacement transducer unit when said stylus is deflected by the surface of said workpiece mounted on said work table when said probing device is moved in a plus direction parallel to the axis of said spindle or in a direction perpendicular to the axis of said spindle, said transducer unit having electronic coupling means to the axis feed rate of the computer numerical control for controlling spindle advance from rapid traverse to zero feed rate, said transducer unit to trigger axis position detection circuit of said computer numerical control when relative motion begins between said stylus mounting head and said support body to track said relative motion until zero velocity is reached, whereby said output of said position detection circuit processed by said computer numerical control to establish relative position of said stylus to said work piece when said probing device is moved in a minus direction parallel to the axis of said spindle or in a direction perpendicular to the axis of said spindle until said stylus is deflected by said work piece.

10. In a machining center having computer numerical control including multiple axis of motion, a probing device, a work table, a spindle, said spindle and said multiple axis of motion of the machine controlled by said computer numerical control, said probing device carried by said spindle comprising a spindle mounted support body, a preloaded anti-friction bearing mounted rigid disc arranged to locate a stylus mounting head in a steep tapered hole in said disc with said stylus mounting head having a matched taper to fit said hole, a cam in said mounting head, a ball carried in said cam in said stylus mounting head, a spring loaded center shaft, a cam in said center shaft for receiving said ball, to locate said stylus mounting head axially in said tapered hole and to locate said stylus mounting head and disc radially in a neutral position, a workpiece, a preloaded anti-friction mounted torque arm slidably mounted on said support body for actuating a machine mounted electronic variable displacement transducer unit, said torque arm being actuated by said spring loaded center shaft when said stylus is deflected by the surface of said workpiece mounted on said work table, a floatably mounted orientation retention ring keying said rigid disc to said fixed support body, said transducer unit having electronic coupling means to the axis feed rate of said computer numerical control for controlling spindle advance from rapid traverse to zero feed rate, said transducer unit to trigger position detection circuit of said computer numerical control when relative motion begins between said stylus mounting head and said support body to track said relative motion until zero velocity is reached, whereby said output of said position detection circuit is processed by said computer numerical control to establish relative position of said stylus to said workpiece when said probing device is moved in a direction perpendicular to the axis of said spindle or in a minus direction parallel to the axis of said spindle until said stylus is deflected by said work piece.

11. In a machining center having computer numerical control including multiple axis of motion; a probing device, a work table, a spindle, said spindle and said multiple axis of motion of the machine controlled by said computer numerical control, said probing device carried by said spindle comprising a spindle mounted support body, a stylus mounting head movable relative to said support body in a plus and minus direction parallel to the axis of said spindle and also in a direction perpendicular to the axis of said spindle, a stylus in said stylus mounting head, a work piece, a machine mounted electronic variable displacement transducer unit, actuated when said stylus is deflected by said workpiece mounted on said work table, said probing device movable in a plus or minus direction parallel to the axis of said spindle or in a direction perpendicular to the axis of said spindle, said transducer unit having electronic coupling means to the axis feed rate of said computer numerical control for controlling spindle advance from rapid traverse to zero feed rate, said transducer unit to trigger axis position detection circuit of said numerical control when relative motion begins between said stylus mounting head and said support body to track said relative motion until zero velocity is reached, whereby said output of said position detection circuit is processed by said computer numerical control to establish relative position of said stylus to said work piece when said probing device is moved in a plus or minus direction parallel to the axis of said spindle or in a direction perpendicular to the axis of said spindle until said stylus is deflected by said work piece.

12. In a machining center having computer numerical control including multiple axis of motion, a probing device, a work table a spindle, said spindle and said multiple axis of motion of the machine controlled by said computer numerical control, said probing device carried by said spindle comprising a spindle mounted support body, a preloaded anti-friction bearing mounted rigid disc, a stylus mounting head having a preloaded spring assembly secured to said mounting head, said spring assembly axially positioning said mounting head in a counter bored hole in said rigid disc, a cam in said mounting head, a ball carried in said cam in said stylus mounting head, a spring loaded center shaft, a cam in said center shaft for receiving said ball to locate said stylus mounting head in said counter bore of said rigid disc, said preloaded spring assembly of said stylus mounting head having a preload value greater than the value of said center shaft spring, said center shaft preloaded spring locates said stylus mounting head and rigid disc radially in a neutral position, a machine mounted electronic variable displacement transducer unit, a preloaded antifriction mounted torque arm slidably mounted on said support body for actuating said machine mounted electronic variable displacement transducer unit, said torque arm being actuated by said spring loaded center shaft when said stylus is deflected by the surface of a work piece mounted on said work table when said probing device is moved in a plus or minus direction parallel to the axis of said spindle or in a direction perpendicular to the axis of said spindle, a floatably mounted orientation retention ring keying said rigid disc to said support body, said transducer unit having electronic coupling means to the axis feed rate of computer numerical control for controlling spindle advance from rapid traverse to zero feed rate, said transducer unit to trigger axis position detection circuit of said computer numerical control when relative motion between said stylus, head and said support body and tracks said relative motion until zero velocity is reached, whereby said output of said position detection circuit is processed by said computer numerical control to establish relative position of said stylus to a work surface when said probing device is moved in a direction perpendicular to the axis of said spindle or in a plus or minus direction parallel to the axis of said spindle until said stylus is deflected by said work surface.

13. In a machine mounted probing device, for computer numerically controlled machining center spindles, having a nonrotating torque arm, a spindle, a torque arm hub, a probing mechanism for actuating said hub, a spring loaded plunger, a machine mounted transducer unit actuated by said torque arm, a latching mechanism releasable upon insertion of said probing device in said spindle, comprising a spring loaded lever mounted in said torque arm, said lever engagable in a slot in said torque arm hub to prevent rotation of said torque arm relative to said torque arm hub when said probing device is removed from said spindle.

14. In a computer numerically controlled machining center with a spindle mounted probing device, including multiple axis of motion, work table, a machine mounted electronic variable displacement transducer unit, said unit comprised of a piston, a cylinder body, said piston slidably mounted in said cylinder body, a transducer actuator connected to said piston, an electronic variable displacement transducer body connected to said cylinder body, limit switches mounted to said cylinder body, means for actuating said limit switches and transducer upon movement of said piston, a spring surrounding said piston, a stylus in said probing device, said probing device having a means to move said piston when the stylus of said probing device is deflected upon contacting an object mounted on said work table during motion of said machine axis, said transducer electronically coupled to a said computer numerical control to generate an out of null signal when said stylus makes contact with said object or an in null signal when said stylus breaks contact with said object, to determine the location of the machine axis.

15. The device as described in claim 14 whereby said electronic variable displacement transducer provides said computer numerical control with signals proportional to transducer displacement which allows software logic to be used to control the deceleration distance of said machine axis motion after said stylus contacts said object displacing said transducer a fixed amount, said deceleration being controlled by axis velocity circuits and position detection circuits in said computer numerical control, said deceleration distance being algebraically added to machine axis location at zero axis velocity to determine axis location of said object.

16. The device as described in claim 14 whereby said electronic variable displacement transducer provides said computer numerical control with signals proportional to transducer displacement thereby allowing software logic to be used to control the rate of deceleration of said machine axis motion after said stylus contacts said object displacing said transducer an amount necessary for said axis to reach zero velocity, said deceleration rate being controlled by axis velocity circuits, said deceleration distance being tracked by position detection circuits in said computer numerical control, said deceleration distance being algebraically added to machine axis location at zero velocity to determine axis location of said object.

17. The device as described in claim 14 whereby said electronic variable displacement transducer provides said computer numerical control with signals proportional to transducer displacement, said proportional signals used to signal computer numerical control of continuing transducer displacement changes as machine axis are programmed to follow the contour of the surface of said object while probe stylus is in contact with said object to define the shape of said surface contour.

18. In a computer numerically controlled machining center with a spindle mounted probing device, including multiple axis of motion, a work table, a machine mounted electronic variable displacement transducer unit, said unit comprised of a piston, a cylinder body, said piston slidably mounted in said cylinder body, a transducer actuator connected to said piston, an electronic variable displacement transducer body connected to said cylinder body, limit switches mounted to said cylinder body, means for actuating said limit switches and transducer upon movement of said piston, a spring surrounding said piston, a stylus in said probing device, a torque arm in said probing device, a plunger on said torque arm to move said piston, a piston mounted limit switch for sensing the presence of said probing device when said probing device is inserted in said machine spindle, means for moving said torque arm as stylus of said probing device is deflected upon contacting an object mounted to said work table, said transducer actuated by said piston, said transducer electronically coupled to a said computer numerical control generates an out of null signal when said stylus makes contact with said object and an in null signal when said stylus breaks contact with said object to determine the location of said object.

* * * * *